Aug. 15, 1933.　　　N. R. KRAUSE　　　1,922,376
CORN HARVESTING MACHINE
Filed Aug. 29, 1932　　　2 Sheets-Sheet 1
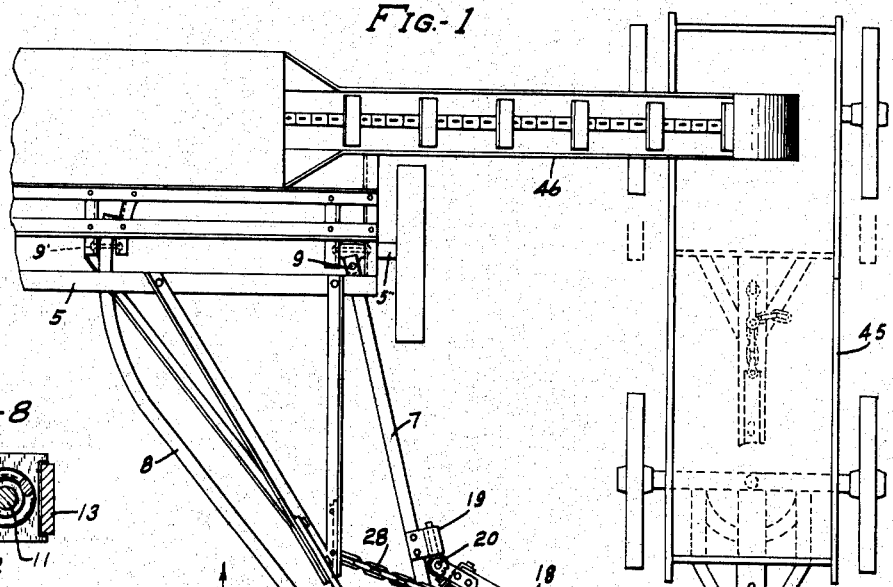
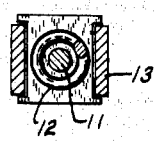
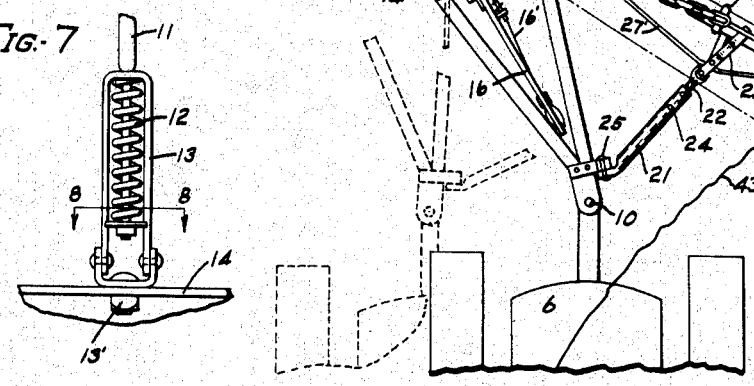
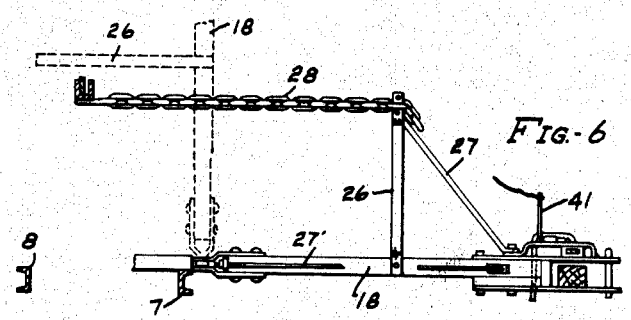
INVENTOR.
NORMAN R. KRAUSE
BY James A. Walsh
ATTORNEY Aug. 15, 1933.   N. R. KRAUSE   1,922,376
CORN HARVESTING MACHINE
Filed Aug. 29, 1932   2 Sheets-Sheet 2
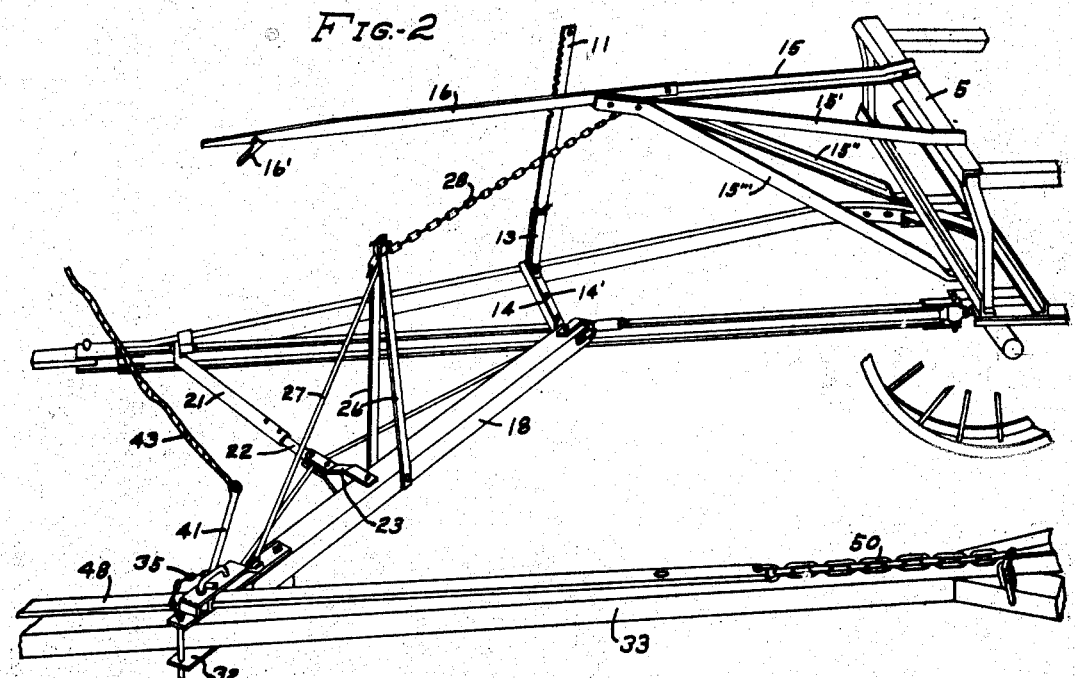
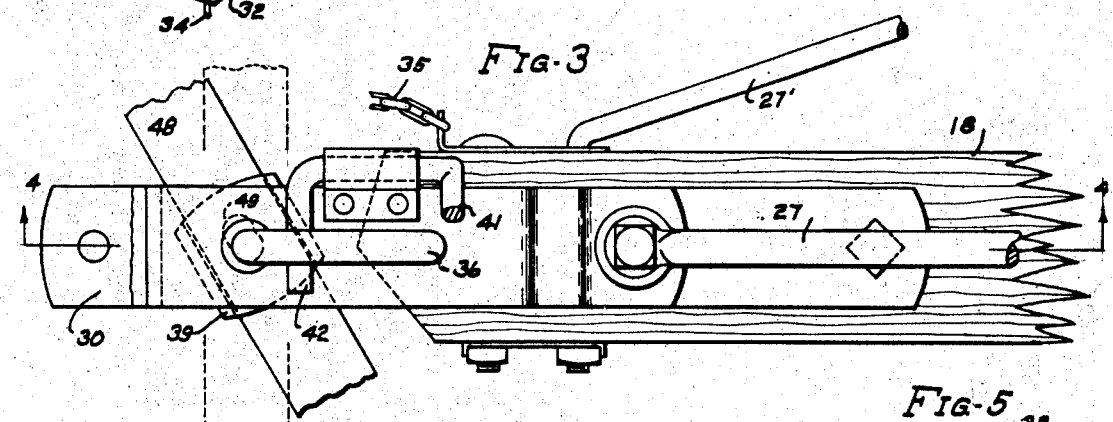
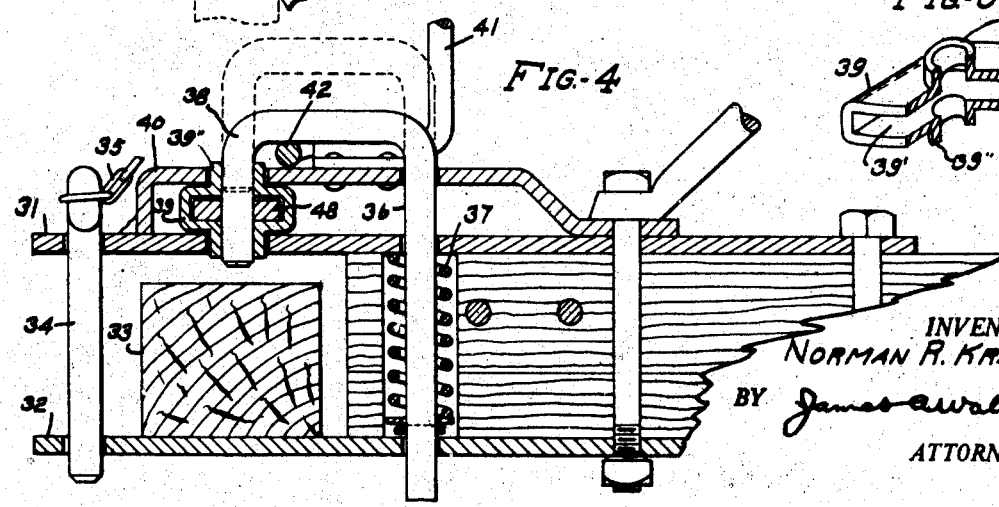
INVENTOR.
NORMAN R. KRAUSE
BY James A. Walsh
ATTORNEY Patented Aug. 15, 1933

1,922,376

UNITED STATES PATENT OFFICE 1,922,376

CORN HARVESTING MACHINE

Norman R. Krause, Racine, Wis., assignor to J. I. Case Company, Racine, Wis., a Corporation Application August 29, 1932. Serial No. 630,818

16 Claims. (Cl. 56—15)

My invention relates to agricultural machines of the corn harvester type employing a drawbar connecting the machine to a tractor and means associated with the drawbar for vertically adjusting the machine, in combination with a wagon hitch connected to the drawbar and flexibly connected to the adjusting means for controlling the movements of the hitch so connected to a wagon tongue that the position of the wagon may be readily changed to receive material in unfilled portions of the wagon compartment, and other advantages will appear from the following description.

In the accompanying drawings, forming part hereof, Figure 1 is a plan view of a tractor drawn machine embodying my improvements; Fig. 2, a fragmentary side elevation showing the hitch-bar connected to the drawbar and supported from the machine adjusting lever; Fig. 3, an enlarged fragmentary plan of the hitch-bar and associated parts; Fig. 4, a detail of the latch mechanism and indicating the hitch-bar and wagon tongue taken on the dotted line 4—4 in Fig. 3; Fig. 5, a perspective view of the latch guide indicated in section in Fig. 4; Fig. 6, a detail section taken on the dotted line 6—6 in Fig. 1; Fig. 7, an elevation of the rack-bar for engaging the adjusting lever; and Fig. 8 is a transverse section taken on the dotted line 8—8 in Fig. 7.

In said drawings the numeral 5 indicates a corn harvester, 6 a tractor, and 7, 8, a drawbar connected to the frame of the machine to the tractor.

The drawbar 7, 8, is pivotally secured to the machine, at 9, 9', and to the tractor, at 10, to provide a flexible connection between them, and on said drawbar I mount a rack-bar 11 the lower end of which, as shown in Figs. 7 and 8, passes through a spring 12 held in a frame 13 so that said rack-bar will be yielding in character. This rack-bar is adjustably mounted on a support 14 having holes 14' therethrough, so that by removing the nut 13' from frame 13, Fig. 7, the rack-bar may be adjusted along the support for the purpose to appear. Secured to the frame and forming part thereof is a system of braces 15, 15', 15'' and 15''' extending forwardly of the machine and to one of the members of which I connect a detachable lever 16 for vertically adjusting the machine independently of the drawbar by rocking it with or on its axle 5', the limit of movement of the lever being controlled by the rack 11 and fixedly held in relation thereto by a latch 16'.

A hitch-bar 18 is hingedly connected, at 19, to the drawbar member 7 to swing vertically, and is also pivoted, at 20, to swing horizontally, so that it has a dual hinge connection with the drawbar for a purpose to appear. At its opposite end the hitch-bar is connected to the drawbar by a telescoping brace comprising the sections 21, 22, universally coupled to a bracket 23 secured to the hitch-bar, which brace may be held in predetermined position by registering holes 24 and a suitable implement (not shown) inserted therein, the section 21 being connected to the drawbar by a horizontal pin 25, which latter hinge device is in alinement with hinge 19 so that the bar 18 and brace 21, 22, may be swung vertically or folded when not in use. Upon said hitch-bar 18 a standard 26 is secured and is trussed to the bar by a rod 27, and which bar is trussed by a rod 27' preferably passing through bracket 23. A chain 28 is secured to the standard and its opposite end connected to the lever brace 15', which chain sustains the bar and brace 21, 22, when the hitch structure is swung vertically or folded, as well as sustaining the hitch-bar in normal horizontal position when lowered. It will be understood that the range of adjustability of lever 16 is somewhat limited as the rocking of the machine is necessarily but a slight vertical action and that the movement of chain 28 is very slight, and that by attaching the chain to the standard 26 on the hitch-bar and to the frame the weight and strain of the suspended bar and associated parts will be transmitted through the lever to the machine frame, by which arrangement distortion and damage to the hitch structure is avoided, which result is common in the use of hitching devices depending for support entirely upon a drawbar.

At the outer end of the hitch-bar I provide a clevis 30 comprising upper and lower straps 31, 32, so spaced as to receive a wagon tongue 33, which latter is held from displacement by a pin 34 adapted to pass through the straps, and is retained on the clevis structure by a chain 35, Fig. 4. In said clevis I provide a yieldingly mounted latch 36 surrounded by a coil spring 37, the latch having its upper portion curved, at 38, and the end of which curved portion is adapted to engage a swiveling guide 39 held between the keeper 40 and strap 31, said guide comprising a receiving body 39' and trunnions 39'' for pivotally mounting it between the keeper 40 and strap 31. Said latch is adjustable for disengagement from the guide 39 by means of a trip-lever 41 pivotally mounted between the keeper 40 and said latch, the lever being angulated as shown in Fig. 3 so that its end 42 crosses the keeper and terminates beneath the curved portion 38 of the latch, and, therefore, by manipulating the latch 41, as by a rope 43 under control of a tractorman, the end of the latch will be released from guide 39 and automatically returned to such engagement by the expanding action of the spring 37.

In the operation of picking standing corn in the fields, and harvesting other crops, it has been the practice to have a complementary wagon 45 alongside the harvester for receiving material discharging therefrom, which wagon must be so connected as to be in proper relation to the discharging means of the machine, such as an elevator 46. For this purpose it has been customary to employ chains or flexible devices for connecting the wagon, which are not sufficiently positive in their draft to satisfactorily maintain the wagon in constant alinement with the elevator discharge, but by my improvement such difficulties are overcome, as by the employment of a rigid hitch-bar 18, and its brace 21, 22, a fixed frame is provided, which receives the lateral thrust of the tongue against the drawbar 7, and, through the hinge connections between such frame and drawbar, a yielding action between the parts is present to compensate for ground irregularities over which the vehicles travel. In order to maintain the wagon box in true alinement and to permit it to be drawn forward sufficiently to fill the rear end, and then dropped back to fill the middle and forward end, I employ a hitch-rod 48 having slots therein, as 49. When the tongue 33 has been engaged with the clevis, as indicated in Fig. 4, the hitch-rod 48 is introduced into the guide 39, the latch 38 having been released to occupy the position indicated in dotted lines in Fig. 4, so that said hitch-rod may be pushed rearwardly through the guide in any convenient direction and brought into parallel coupling relation with the tongue and connected to the latter by a chain 50 and an evener pin 51. As the hitch-rod is held in the guide 39, so that the rod will be permitted but slight lateral play, it will be understood that, when secured by the latch 38 which engages one of the slots 49 in said rod 48, such connection, with that of pin 51, holds the wagon in fixed relation to the discharge end of the elevator 46, as indicated in Fig. 1, different positions of the wagon box being indicated by the full and dotted lines and in which it may be held by the latch and hitch-rod in the manner described. As commonly practiced, when drawing the wagon alongside the machine by a team its alinement with the elevator discharge is difficult, but by employing the swiveling guide 39 by which the hitch-rod may be swung at any angle laterally in relation to the bar 18, ample space for varied movements of the tongue 33 being provided in the clevis, and when the rod 48 is connected by the pin 51 and locked by the latch 38, it will be apparent that as the tractor 6 moves forward the hitch-rod, by reason of the swiveling guide in which it is held, will become so adjusted as to pull the wagon into alinement with said elevator discharge and thus maintain it from undue swerving incident to ground inequalities.

By connecting the hitch-bar 18 to the drawbar 7 by means of the telescoping brace 21, 22, said hitch-bar is capable of a wide range of adjustability, so that through its vertical pivot 20 and the similar pivot at 23 securing the telescoping brace it will be understood that the hitch-bar may be swung inwardly and outwardly in relation to the drawbar 7 to position the wagon at different distances from the machine as circumstances demand; and that when the hitch-bar is disconnected from the wagon tongue said bar and its telescoping brace, with the parts associated therewith, may be swung upwardly by means of the horizontal hinges 19 and 25, and so sustained from the frame 15' by the chain 28 to avoid contact with obstructions as the outfit is traveling, as well as to make it possible to draw another wagon within coupling range without interference, while the hitch-rod 48 may be separately carried on the drawbar or machine, as desired.

A drawbar of the character disclosed is pivotally connected to the machine so that it may be laterally adjusted to the position shown in full lines in Fig. 1 whereby the tractor and machine will be in offset relation, or the tractor may be swung inwardly to varying degrees to be positioned either in direct alinement with the machine, as indicated by the dotted lines, or otherwise. When it is desired to adjust the drawbar the lever 16 is detached from the brace 15, and the nut 13' removed from the rack-bar frame 13, when the latter may be moved along the support 14 to be reconnected in one of the holes 14', and should the drawbar be brought to the dotted line position shown in Fig. 1 the lever 16 will be secured to the brace member 15', by which means for transferring the lever the outer end thereof will be in substantial alinement with the pivotal connection 10 between the bar and tractor and at all times within convenient reach of the operator stationed on the tractor.

As thus shown and described, I produce a combined drawbar, hitch-bar and lever so arranged that the weight and strain of the projecting hitch-bar will be transmitted to the machine frame through said lever, 16, and that sagging and distortion of the parts are avoided, the combined structure being relieved from shocks when the machine encounters ground irregularities through the yielding action of the rack 11 which supports the lever in adjusted positions.

I claim as my invention:

1. In a machine of the class described, a frame, a drawbar connected to the frame, a support on the drawbar, a rack-bar on the support, a lever connected to the frame for vertically adjusting the machine and engageable by the rack-bar to maintain the machine in predetermined adjusted positions, a wagon-hitch pivotally mounted on the drawbar, and flexible means connecting the hitch and the frame for sustaining the hitch in normal position and also during the vertical movements of the lever.

2. In a machine of the class described, a frame, a drawbar connected to the frame, a yieldingly mounted rack-bar supported on the drawbar, a lever connected to the frame for vertically adjusting the machine and engaged by the rack-bar for maintaining the machine in predetermined adjusted positions, a wagon hitch pivotally mounted on the drawbar, and flexible means connecting the frame and the hitch for sustaining the latter.

3. In a machine of the class described, a frame, a laterally adjustable drawbar connected to the frame, a rack-bar mounted on the drawbar, a lever connected to the frame and adapted to engage the rack-bar, means associated with the drawbar whereby the rack-bar may be adjusted to follow the lateral movements of the drawbar for constantly maintaining the lever in engagement therewith, a hitch pivotally mounted on the drawbar, and flexible means connecting the frame and the hitch for sustaining the latter.

4. In a machine of the class described, a frame, a laterally adjustable drawbar connected to the frame, a yielding and laterally adjustable rack-bar mounted on the drawbar, a lever connected to the frame and adapted to engage the rack-bar, a wagon hitch mounted on the drawbar, and means connecting the frame and the hitch for sustaining the latter both in normal position and also when said lever is vertically adjusted.

5. In a machine of the class described, a frame, a laterally adjustable drawbar, a lever connected to the frame, means for detaching the lever from the frame and connecting the same to another portion thereof according to the laterally adjusted position of the drawbar whereby the lever will be within convenient reach of an operator, means on the drawbar for maintaining the lever in position, a wagon hitch on the drawbar, and means connecting the frame and hitch for sustaining the latter in normal position and also when said lever is vertically adjusted.

6. In a machine of the class described, a frame, a drawbar connected to the frame, a lever connected to the frame for vertically adjusting the machine, means on the drawbar for maintaining the lever in fixed position, a hitch-bar pivotally connected to the drawbar, a clevis on the hitch-bar, means for confining a wagon tongue in the clevis, and flexible means connected to the frame for sustaining the hitch in varied positions.

7. In a machine of the class described, a frame, a drawbar connected to the frame, a lever connected to the frame for vertically adjusting the machine, means on the drawbar for maintaining the lever in fixed position, a hitch-bar pivotally connected to the drawbar, a clevis on the hitch-bar for receiving a wagon tongue, a hitch-rod adapted to be mounted on the tongue, means for latching the hitch-rod to the hitch-bar, and means connected to the frame and to the hitch-bar for sustaining the latter in varied positions.

8. In a machine of the class described, a frame, a drawbar connected to the frame, a lever connected to the frame for vertically adjusting the machine, means on the drawbar for maintaining the lever in fixed position, a hitch-bar pivotally connected to the drawbar, means on the hitch-bar for retaining a wagon tongue, a hitch-rod, a swiveling guide on the hitch-bar for retaining the hitch-rod, releasable means on the hitch-bar for engaging the hitch-rod, means for securing the hitch-rod to a wagon tongue, and flexible means connecting the frame and the hitch-bar for sustaining the latter in varied adjusted positions.

9. In a machine of the class described, a frame, a drawbar connected to the frame, means connected to the frame for vertically adjusting the machine, means on the drawbar for maintaining the adjusting means in fixed position, a hitch-bar pivotally connected to the drawbar, a standard on the hitch-bar, flexible means connected at one end to the standard, and means connected to the opposite end of the flexible means for sustaining the hitch-bar in relation to the drawbar.

10. The combination, with a machine of the class described, of a frame, a drawbar, means connected to the frame for vertically adjusting the machine, means on the drawbar for maintaining the adjusting means in fixed position, a hitch-bar pivotally connected to the drawbar, a latch yieldingly mounted on the hitch-bar, a trip-rod pivotally connected to the hitch-bar and adapted to release the latch from a hitch-rod, and means under control of an operator for actuating the trip-rod.

11. The combination, with a machine of the class described, of a frame, a drawbar, means connected to the frame for vertically adjusting the machine, means on the drawbar for maintaining the adjusting means in fixed position, a hitch-bar pivotally connected to the drawbar, a swiveling guide on the hitch-bar adapted to receive a hitch-rod, a latch yieldingly mounted on the hitch-bar and normally engaged with the guide, and means on the hitch-bar for releasing the latch.

12. The combination, with a machine of the class described, of a frame, a drawbar, means connected to the frame for vertically adjusting the machine, means on the drawbar for maintaining the adjusting means in fixed position, a hitch-bar pivotally connected to the drawbar, a clevis on the hitch-bar, a guide associated with the clevis and adapted to receive a hitch-rod, a latch yieldingly mounted on the hitch-bar and normally engaged with the guide, and means on the hitch-bar for releasing the latch from the guide so that a hitch-rod may be adjusted in the latter.

13. The combination, with a machine of the class described, of a frame, a drawbar, means connected to the frame for vertically adjusting the machine, means on the drawbar for maintaining the adpusting means in fixed position, a hitch-bar pivotally connected to the drawbar, a clevis on the hitch-bar, a guide associated with the clevis, a slotted hitch-rod insertable in the guide, a latch yieldingly mounted on the hitch-bar and normally engaging the guide and hitch-rod, means for releasing the latch so that the hitch-rod may be inserted in and removed from the guide, and means for connecting the rod to a wagon tongue.

14. The combination, with a machine of the class described, of a frame, a drawbar, means connected to the frame for vertically adjusting the machine, means on the drawbar for maintaining the adjusting means in fixed position, a hitch-bar pivotally connected to the drawbar, a guide having a rod receiving member and means for pivotally mounting the guide on the hitch-bar, a latch yieldingly mounted on the hitch-bar and adapted to normally engage the guide, and means on the hitch-bar for releasing the latch from the guide.

15. The combination, with a machine of the class described, of a frame, a drawbar, means connected to the frame for vertically adjusting the machine, means on the drawbar for maintaining the adjusting means in fixed position, a hitch-bar pivotally connected to the drawbar, means on the hitch-bar for receiving a wagon tongue, means on the hitch-bar for receiving a hitch-rod, means on the hitch-bar for retaining a hitch-rod in said receiving means, means for disengaging said retaining means to release a hitch-rod, and means connected at one end to the hitch-bar and at its opposite end connected to the machine for sustaining the hitch-bar.

16. The combination, with an agricultural machine, of a frame, a drawbar, means connected to the frame for vertically adjusting the machine, means on the drawbar for maintaining the adjusting means in fixed position, a hitch-bar pivotally connected to the drawbar, means on the hitch-bar for receiving a wagon tongue, means on the hitch-bar for receiving and retaining a hitch-rod said hitch-rod having means for adjustably securing it to a wagon tongue, and means for disengaging the hitch-rod from said receiving and retaining means.

NORMAN R. KRAUSE.